United States Patent Office

3,547,907
Patented Dec. 15, 1970

3,547,907
STARCH MODIFICATION WITH
PEROXYDIPHOSPHATE SALT
John A. Shepherd, Princeton, and Bernard Cohen and Leonard R. Darbee, Trenton, N.J., assignors to FMC Corporation, New York, N.Y., a corporation of Delaware
No Drawing. Filed Aug. 28, 1968, Ser. No. 755,816
Int. Cl. C08b *19/01*
U.S. Cl. 260—233.3                    6 Claims

ABSTRACT OF THE DISCLOSURE

Native starches are modified so that they yield a low viscosity, high solids starch paste by contacting the starches with an effective amount of a peroxydiphosphate salt having the structure $M_nR_{4-n}P_2O_8$ where M may be either sodium, potassium or ammonium, R may be either sodium, potassium, ammonium or hydrogen and $n$ is an integer from 1 to 4, at temperatures below the gelatinization temperature of starch.

BACKGROUND OF THE INVENTION

Field of the invention

This invention relates to the oxidative modification of native starches so that they can form starch pastes having low viscosities and high solids contents.

Description of the prior art

Starches are commonly employed in the manufacture of woven cloth and also in the makeup of paper and paper products. In woven fabrics the starch acts as a sizing and as a lubricant during the weaving operation and also is used in the finishing of certain cloths. In the case of paper and paper products, the starch serves as an adhesive to increase their strength and also, if pigments are present, the starch bonds the pigment particles to the paper web.

The starch is prepared for use in the above applications by heating a modified starch with water to temperatures above its gelatinization temperature to form a starch paste. Unmodified or native starches are undesirable for this application because they have too high a viscosity after cooking. While the viscosity of the starch paste can be reduced by lowering the concentration of starch (solids content) in the slurry, this is undesired because it dilutes the amount of starch which is applied to the article to be treated. To reduce this high paste viscosity, the starch is usually modified prior to heating at above its gelatinization temperature by conventional treatments such as oxidation by hydrogen peroxide, hypochlorites, and the like. Another popular method of modifying the starch is to treat it by enzymatic action.

By means of the above starch modification techniques, a modified starch can be gelatinized to yield starch pastes having a high solids content and whose viscosity is lowered to desired workable levels. The exact viscosity desired, will, of course, vary depending upon the application to which the starch paste is utilized. However, when coating paper webs, a high solids content in the starch paste permits the web to pick up greater amounts of starch for use in coating the web. Advantageously, the high solids content starch paste has lower amounts of water therein, and therefore the amount of water which must be evaporated from the web is advantageously reduced.

Many difficulties have arisen in the preparation of such modified (oxidized) starches. For example, if the starch modification takes place at the mill where the resulting oxidized starch is used as a coated composition for paper webs or woven fabrics, such modification of the starch must be made by oxidizing it with conventional chemical oxidants, for example, sodium hypochloride or hydrogen peroxide stored in the plant. Many of these liquid oxidizing agents are relatively unstable and lose their active oxygen or chlorine content during storage. They also must be diluted with large amounts of water, thereby requiring special mixing tanks and equipment and careful handling.

Another difficulty is that a further reduction in the viscosity of starch pastes made from conventionally modified starches has been desired but has not been obtained. For example, if a starch paste is desired having a slightly higher solids content, the addition of increased amounts of even conventionally modified starch to reach the higher solids content desired raises the viscosity of the resulting paste beyond that which can be utilized in existing coating machines.

OBJECTS OF THE INVENTION

It is an object of the invention to modify starch in a manner that will permit the makeup of starch pastes having increased solids content but whose viscosities remain low and within workable ranges.

It is another object of the present invention to oxidize starch by a process in which the oxidizing agent is not subject to deterioration upon standing or storage.

These and other objects will be apparent from the following description of the invention.

SUMMARY OF THE INVENTION

It has now been found that native (unmodified) starches can be oxidized so that upon gelatinization they yield a low viscosity, high solids paste; these starches are modified by contacting them with an effective amount of a peroxydiphosphate salt at temperatures below the gelatinization temperatures of said starch, wherein the peroxydiphosphate salts have the structure $M_nR_{4-n}P_2O_8$ where M may be either sodium, potassium or ammonium, R may be either sodium, potassium, ammonium or hydrogen and $n$ is an integer from 1 to 4.

DESCRIPTION OF THE INVENTION AND THE PREFERRED EMBODIMENTS

In carrying out the present invention, an aqueous slurry of starch is prepared. The starch may be any raw starch commonly derived from corn, potatoes, tapioca, rice, wheat, sorghum, and the like. The preferred starch is pearl cornstarch because it is cheap and readily available in commercial quantities. The physical form of the starch may be either finely ground starch or may be pearl sized.

To the resulting aqueous starch slurry is then added a peroxydiphosphate salt in amounts sufficient to yield an active oxygen concentration of at least about 0.005 to 0.200% based on the weight of the starch. The peroxydiphosphate salt is one having the formula $M_nR_{4-n}P_2O_8$ in which M is either sodium, potassium or ammonium and R is sodium, potassium, ammonium or hydrogen and where $n$ is an integer of from 1 to 4. Typical peroxydiphosphate salts which are effective are tetrapotassium peroxydiphosphate ($K_4P_2O_8$), tetrasodium peroxydiphosphate ($Na_4P_2O_8(H_2O)_{0\ to\ 20}$), tetra-ammonium peroxydiphosphate ($(NH_4)_4P_2O_8$), dihydrogen dipotassium peroxydiphosphate ($K_2H_2P_2O_8$), dihydrogen disodium peroxydiphosphate ($Na_2H_2P_2O_8$), diammonium dihydrogen peroxydiphosphate ($(NH_4)_2H_2P_2O_8 \cdot 2H_2O$), tripotassium monosodium peroxydiphosphate ($K_3NaP_2O_8$), dipotassium disodium peroxydiphosphate ($K_2Na_2P_2O_8 \cdot 2H_2O$), monopotassium trisodium peroxydiphosphate $$(KNa_3P_2O_8)$$

monoammonium tripotassium peroxydiphosphate $$(K_3(NH_4)P_2O_8)$$

diammonium dipotassium peroxydiphosphate $$(K_2(NH_4)_2P_2O_8 \cdot 2H_2O)$$

triammonium monopotassium peroxydiphosphate $$(K(NH_4)_3P_2O_8 \cdot 2H_2O)$$

monoammonium trisodium peroxydiphosphate $$(NH_4Na_3P_2O_8)$$

diammonium disodium peroxydiphosphate $$((NH_4)_2Na_2P_2O_8)$$

triammonium monosodium peroxydiphosphate $$((NH_4)_3NaP_2O_8)$$

monopotassium monosodium dihydrogen peroxydiphosphate $$(KNaH_2P_2O_8)$$

monoammonium monopotassium dihydrogen peroxydiphosphate ($(K(NH_4)H_2P_2O_8)$), monoammonium monosodium dihydrogen peroxydiphosphate ($Na(NH_4)H_2P_2O_8$).

The preferred peroxydiphosphate salt is the tetrapotassium diphosphate $K_4P_2O_8$. The tetrapotassium peroxydiphosphate may be produced by the method reported by F. Fichter and E. Gutzwiller, Helv. Chim. Acta 11, 323–337 (1928). Another method which may be utilized is the electrolysis of an anolyte containing an aqueous mixture of potassium, phosphate and fluoride ions separated by diaphragm means from a catholyte containing an aqueous mixture of phosphate ions. This latter preparation is reported in copending application Ser. No. 688,525, filed Dec. 6, 1967 in the name of Paul R. Mucenieks. The mixed cationic or protonated peroxydiphosphate salt may be easily prepared by dissolving the tetrapotassium peroxydiphosphate salt in a solvent such as water, and adding a stoichiometric amount of the desired cation or hydrogen ion in solution which is to replace, in part, the potassium salt, e.g., sodium. The desired cation or hydrogen is preferably added either as a perchlorate salt or perchloric acid so that upon its addition, e.g., sodium perchlorate, a stoichiometric amount of potassium equivalent to the added cation or hydrogen precipitates as potassium perchlorate and can be separated from the remaining solution of the mixed potassium-added cation peroxydiphosphate solution, e.g., potassium sodium peroxydiphosphate. The desired mixed salt may then be precipitated from its aqueous solution by adding a non-solvent to the solution, such as alcohol, and the desired mixed peroxydiphosphate salt, e.g., potassium sodium peroxydiphosphate, precipitates therefrom. In certain instances, particularly in the $K_2Na_2P_2O_8$ preparation, the aqueous solution must be evaporated to properly precipitate the mixed salt.

The mixture of starch, water and the added peroxydiphosphate salt are then thoroughly mixed so that the peroxydiphosphate is uniformly distributed throughout the starch slurry. Thereafter, the entire mixture is heated to a temperature below the gelatinization temperature of the starch utilized. During this heating, the suspension should be vigorously agitated while being maintained at a temperature which is below the gelatinization temperature. In practice, most starches have gelatinization temperatures of 175° F. or more, and the temperature at which the starch slurry containing the peroxydiphosphate salt is heated is below this tempearture. Normally, temperatures on the order of from 120–170° F. have been found effective.

During this heating stage the starch is oxidized by the peroxydiphosphate salt which is uniformly dissolved throughout the starch slurry. The equipment utilized in this heating stage can be any conventional heating apparatus in which the starch slurry can be brought up to the desired temperature. These may include substantially open vessels in which the starch slurry is heated at no greater than atmospheric pressures. It may also include apparatus for continuous heating of starch slurry under superatmospheric pressures. In many such superatmospheric type heaters, live steam is injected directly into the slurry as the principal heating means. Other heaters, whether superatmospheric or atmospheric pressure types, may employ indirect heating in which steam or other hot liquid is circulated in out-of-contact heat transfer with the starch slurry.

In the above-described starch modification step, the starch is modified using a peroxydiphosphate salt without gelatinizing the starch. However, it is considered within the scope of the present invention to modify the starch in an initial step and to subsequently gelatinize the thus modified starch in a second step by further heating the modified starch slurry to a higher temperature. This two-step process can be carried out continuously in the same piece of equipment used to modify the starch by further heating the modified starch slurry at temperatures above the gelatinization temperature, i.e., about 175° F. or above.

In the above description of the invention, the starch slurry is heated only with the peroxydiphosphate salt. However, it is to be understood that other additives can be utilized along with the starch, where desired. For example, if the starch is to be used in coating paper webs, the starch can be mixed with conventional pigments and the mixture of starch and pigment heated in the presence of the peroxydiphosphate salt in the heating stage previously described. Other additives, such as coloring agents, surface active agents or buffering agents, can also be used, if desired. Normally, the use of a peroxydiphosphate modifying agent results in obtaining a starch slurry having a substantially neutral pH. If more alkaline pH's are required, various alkalies such as sodium hydroxide, sodium bicarbonate and sodium carbonate may be added to adjust the pH of the resulting starch slurry.

The following examples are given to illustrate the present invention and are not deemed to be limiting thereof.

EXAMPLE 1

Run A—Process of the invention

An 11.1% (dry starch basis) solids slurry was prepared by adding 50 g. (dry starch basis) of unmodified pearl cornstarch to 400 g. of water. The resulting pH of the slurry was 5.30. To the slurry was then added 1.4 g. of tetrapotassium peroxydiphosphate, thereby providing an active oxygen content of 0.13% based on the dry weight of the starch. The starch slurry was then placed in a water bath at ambient temperature, and the slurry was constantly stirred while the temperature in the water bath was slowly increased. The temperature of the starch slurry increased until it reached a temperature range of from about 160–170° F. during which the starch modification occurred over a period of about 20 minutes. The temperature of the starch slurry was allowed to rise to 200° F. and was held at this temperature for 30 minutes. Thereafter, the thoroughly cooked and pasted starch was removed from the water bath, and viscosity measurements were taken as the paste temperature dropped towards ambient temperature. The viscosity measurements were taken with a Brookfield Model RVT Viscometer using the number 4 spindle at 20 r.p.m. Viscosity readings in centipoise were thus obtained. These results are set forth in Table I. The pH of the modified starch paste at the end of the heating stage was 7.0.

The tetrapotassium peroxydiphosphate was produced by electrolysis of an anolyte containing an aqueous mixture of potassium, phosphate and fluoride ions and a catholyte containing an aqueous mixture of phosphate ions in which the anolyte and catholyte are separated by diaphragm means. This preparation is reported in detail in copending application Ser. No. 688,525, filed Dec. 6, 1968 in the name of Paul R. Mucenieks.

Run B—Process of the prior art

A similar sample of starch was treated as set forth in Run A except that conventional hydrogen peroxide was used as a modifying agent in place of the tetrapotassium peroxydiphosphate. In this case the following materials were added to the slurry with stirring in the order set forth: (a) 0.23 g. $Na_2CO_3$ for pH control, (b) 0.01 g. $CuSO_4$ for catalytic promotion and (c) 2.2 ml. of 6% $H_2O_2$ for starch modification (active oxygen content, 0.13% based on the dry weight of the starch). The viscosities of the $H_2O_2$ modified starch paste were taken at temperatures from 180° F. to 80° F. and are set forth in Table I. The pH of the hydrogen peroxide modified starch was 7.7.

EXAMPLE 2

The procedure of Example 1, Run A, was repeated except that tetra-ammonium peroxydiphosphate,

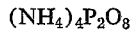
$(NH_4)_4P_2O_8$ was employed in place of the tetrapotassium peroxydiphosphate. The tetra-ammonium peroxydiphosphate was added in amounts of 1.083 g. sufficient to provide 0.13% active oxygen based on the dry weight of the starch used. The starch mixture, which had an 11.1% solids content, was then tested for viscosity as set forth in Example 1 at temperatures of from 180° F. to 80° F. These results are set forth in Table I. The pH of the ammonium peroxydiphosphate modified starch paste was 6.70.

The tetra-ammonium peroxydiphosphate was prepared by dissolving 14.7 g. of tetrapotassium peroxydiphosphate in 35 ml. of water. Thereafter, 23.5 g. of ammonium perchlorate, $NH_4ClO_4$, were dissolved in 150 ml. of a separate water solution. The two solutions were cooled and then mixed together at 0° C. and allowed to stand for about 20 minutes. A precipitate of potassium perchlorate, $KClO_4$, was separated from the resulting supernatant liquid. The supernatant liquid was then added to 500 ml. of ethanol, and tetra-ammonium peroxydiphosphate was precipitated therefrom. On separating of the precipitate it was recrystallized slowly from a water ethanol mixture to yield a substantially pure tetra-ammonium peroxydiphosphate product.

EXAMPLE 3

The procedure of Example 1, Run A, was repeated using 1.224 g. of dipotassium diammonium peroxydiphosphate which provided 0.13% active oxygen based on the dry starch content. The viscosity measurement of the dipotassium diammonium peroxydiphosphate modified paste was then determined at temperatures of from 180° F. to 80° F. and is set forth in Table I. The pH of the resulting paste was 6.9.

Dipotassium diammonium peroxydiphosphate

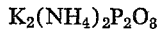
$K_2(NH_4)_2P_2O_8$ was prepared as follows: 34 g. of tetrapotassium peroxydiphosphate were first dissolved in 100 ml. of water. Simultaneously, 23.5 g. of ammonium perchlorate were dissolved in 125 ml. of water. The solutions were each cooled and then mixed at about 0° C. and allowed to stand for 30 minutes. A potassium perchlorate precipitate was obtained which is separated from the supernatant solution. The potassium perchlorate was discarded, and the supernatant solution was added to 500 ml. of methanol and a precipitate of dipotassium diammonium peroxydiphosphate having two moles of water of crystallization was obtained as the product.

EXAMPLE 4

The procedure of Example 1, Run A, was repeated except that 1.083 g. of diammonium dihydrogen peroxydiphosphate were employed in place of the tetrapotassium peroxydiphosphate of Run A. This provided a 0.13% active oxygen based on the dry weight of the starch employed. The viscosity of the resulting paste mixture was measured at temperatures of from 180° F. to 80° F. and is is reported in Table I. The pH of the resulting paste mixture was 6.8.

Diammonium dihydrogen peroxydiphosphate was prepared as follows: 34.6 g. of tetrapotassium peroxydiphosphate were dissolved in 80 ml. of water. Thereafter, 28.6 g. of 70% perchloric acid were added to the solution after cooling both solutions so that temperatures were about 0° C. The resulting mixture was allowed to remain for 30 minutes at 0° C., and potassium perchlorate precipitated from the solution. The potassium perchlorate precipitate was discarded, and 23.5 g. of ammonium perchlorate were dissolved in 125 ml. of water. This solution was added to the supernatant liquid previously separated after both had been cooled to 0° C. The solution was allowed to remain at 30 minutes and a precipitate of potassium perchlorate was obtained and separated from the supernatant liquid. The resulting mother liquor was then added to one liter of ethanol, and a precipitate, diammonium dihydrogen peroxydiphosphate, was obtained.

EXAMPLE 5

The procedure of Example 1, Run A, was repeated except that an equivalent amount of tetrasodium peroxydiphosphate sufficient to provide a 0.13% active oxygen based on the dry weight of the starch employed was utilized in place of the tetrapotassium peroxydiphosphate of Run A. The viscosity of the resulting starch paste mixture was substantially the same as reported in Example 2.

The tetrasodium peroxydiphosphate was prepared as follows: 34.6 g. of tetrapotassium peroxydiphosphate were dissolved in 100 ml. of water. Simultaneously, 56.2 g. of sodium perchlorate monohydrate were dissolved in 50 ml. of water. The two mixtures were cooled and mixed together at 0° C. and allowed to remain for 30 minutes. Potassium perchlorate precipitated and was filtered from the supernatant liquid. The supernatant liquid was then added to 500 ml. of methanol, and a solid precipitate of tetrasodium peroxydiphosphate containing 20 waters of crystallization were obtained ($Na_4P_2O_8 \cdot 20H_2O$). On standing at room temperature, the resulting product lost water and dehydrated to some 4 to 6 waters of crystallization. Thereafter, the tetrasodium peroxydiphosphate was dehydrated at 50–60° C. under vacuum to tetrasodium peroxdiphosphate containing no water of crystallization.

EXAMPLE 6

The procedure of Example 1, Run A, was repeated except that an equivalent amount of dipotassium disodium peroxydiphosphate was employed in place of the tetrapotassium peroxydiphosphate of Run A to yield an active oxygen concentration of 0.13% based on the dry weight of the starch employed. The viscosity of the resulting paste mixture was found to be substantially the same as set forth in Example 2.

The dipotassium disodium peroxydiphosphate was prepared as follows: 34.6 g. of tetrapotassium peroxydiphosphate were dissolved in 100 ml. of water. Simultaneously, 28.1 g. of sodium perchlorate monohydrate were dissolved in 25 ml. of water. The two solutions were cooled and mixed at 0° C. and allowed to stand for 30 minutes. A precipitate of potassium perchlorate was separated and discarded from the supernatant liquid. The supernatant liquid was then added to 300 ml. of methanol, and a two-phase liquid system was obtained. The lower, dense, syrupy phase wah then separated from the upper phase and evaporated. A precipitate crystallized from this lower liquid phase which was identified as dipotassium disodium peroxydiphosphate, $K_2Na_2P_2O_8 \cdot 2H_2O$, containing two waters of hydration, and was recovered.

EXAMPLE 7

The procedure of Example 1, Run A, was repeated using enough tetrapotassium peroxydiphosphate to provide 1.3% active oxygen based on dry weight of the starch. The results are set forth in Table I.

As will be seen from Table I, the tetrapotassium peroxydiphosphate is the preferred embodiment, since it yields the lowest viscosity modified starch paste. However, the other peroxydiphosphate salts also yield low viscosities, although not as low as the tetrapotassium peroxydiphosphate modifier. It should be noted that these results are substantially lower than that obtained when using a common modifier of the prior art, namely hydrogen peroxide.

The present invention also has other advantages. Chief among these is that the peroxydiphosphate salts are extremely stable whether they be in aqueous solutions or in the solid state. This stability remains even on standing or storage for long periods of time. Accordingly, no lose of active oxygen occurs when these modifiers are stored at the plant for use.

An ancillary advantage of these peroxydiphosphate modifiers is that it is possible to mix the native starch with the peroxydiphosphate in a stable, powdered mixture. The combined starch-peroxydiphosphate mixture can be immediately shipped and used at the plant by simply heating an aqueous slurry of the mixture to modify all of the starch therein, further heating the slurry of modified starch to gelatinize the modified starch, and finally passing the resulting starch paste to the equipment used to distribute the paste on the surface of the web or cloth. This modifier also has the advantage of not requiring catalytic promoters, such as copper sulfate, which are normally utilized with hydrogen peroxide. This helps to eliminate trace impurities of catalytic materials which might interfere with the end use of the starch. Also, the present modified starch paste has a substantially neutral pH and no pH adjustment is required if the starch paste is to be used at the pH of about 7. Obviously, if an alkaline starch is desired, alkalies may be added to adjust the pH to the desired range.

Pursuant to the requirements of the patent statutes, the principle of this invention has been explained and exemplified in a manner so that it can be readily practiced by those skilled in the art, such exemplification including what is considered to represent the best embodiment of the invention. However, it should be clearly understood that, within the scope of the appended claims, the invention may be practiced by those skilled in the art, and having the benefit of this disclosure otherwise than as specifically described and exemplified herein.

What is claimed is:

1. Process for modifying native starches which comprises contacting an aqueous slurry of said native starch with an amount of a peroxydiphosphate salt sufficient to yield an active oxygen concentration of at least about 0.005 to 0.2% based on the weight of said starch, heating the resulting mixture to temperatures below the gelatinization temperature of said starch, said peroxydiphosphate salt having the structure $M_nR_{4-n}P_2O_8$ in which M is selected from the group consisting of sodium, potassium or ammonium, R is selected from the group consisting of sodium, potassium, ammonium and hydrogen and $n$ is an integer from 1 to 4.

2. Process of claim 1 in which the preoxydiphosphate salt is tetrapotassium peroxydiphosphate.

3. Process of claim 1 wherein the modification takes place at temperatures of about 120–170° F.

4. Process of claim 1 wherein the peroxydiphosphate salt is used in amounts to provide at least about 0.005% of active oxygen based on the starch content of said slurry.

5. Process of claim 1 wherein said modified starch is heated further at temperatures above the gelatinization temperature of said modified starch and a low viscosity, high solids, starch paste is obtained.

6. A novel composition comprising a native starch and an effective, modifying amount of a peroxydiphosphate salt having the structure $M_nR_{4-n}P_2O_8$ in which M is selected from the group consisting of sodium, potassium or ammonium, R is selected from the group consisting of sodium, potassium, ammonium and hydrogen and $n$ is an integer from 1 to 4.

TABLE I

| Examples: | Modifier | A. O.,[1] percent | Viscosity in centipoises of modified starch pastes at several paste temperatures | | | | | | | | | |
|---|---|---|---|---|---|---|---|---|---|---|---|---|
| | | | 180° | 170° | 160° | 150° | 140° | 130° | 120° | 110° | 100° | 90° |
| 1, Run A | $K_4P_2O_8$ | 0.13 | 116 | 130 | 145 | 160 | 197 | 262 | 290 | 300 | 310 | |
| 1, Run B | $H_2O_2$ | 0.13 | 420 | 600 | 900 | 1,350 | 2,260 | 4,700 | 6,900 | | | |
| 2 | $(NH_4)_4P_2O_8$ | 0.13 | 420 | 560 | 750 | 1,050 | 1,750 | 2,250 | 2,900 | 3,800 | | |
| 3 | $K_2(NH_4)_2P_2O_8$ | 0.13 | 800 | 890 | 900 | 1,000 | 1,100 | 1,250 | 1,600 | 2,000 | 2,500 | 3,100 |
| 4 | $(NH_4)_2H_2P_2O_8$ | 0.13 | 1,630 | 1,300 | 1,650 | 2,100 | 2,550 | 2,750 | 3,300 | | | |
| 5 | $Na_4P_2O_8$ | 0.13 | (Same as Example 2) | | | | | | | | | |
| 6 | $K_2Na_2P_2O_8$ | 0.13 | (Same as Example 2) | | | | | | | | | |
| 7 | $K_4P_2O_8$ | 1.3 | 110 | 140 | 140 | 140 | 140 | 140 | | 180 | | 250 |

[1] Active oxygen level based on dry weight of starch.

References Cited

UNITED STATES PATENTS 2,801,242   7/1957   Kerr et al.   260—233.5
3,320,237   5/1967   Greidinger et al.   260—233.5

DONALD E. CZAJA, Primary Examiner

M. I. MARQUIS, Assistant Examiner

U.S. Cl. X.R.

106—214; 117—165; 260—233.5